United States Patent [19]

Schlichte

[11] 3,881,064

[45] Apr. 29, 1975

[54] PULSE CODE MODULATION TIME DIVISION SWITCHING SYSTEM

[75] Inventor: Max Schlichte, Munich, Germany

[73] Assignee: Siemens Aktiengesellschaft, Munich, Germany

[22] Filed: Sept. 29, 1972

[21] Appl. No.: 293,499

[30] Foreign Application Priority Data

Sept. 30, 1971 Germany .......................... 2148994

[52] U.S. Cl. ........................................ 179/15 AT

[51] Int. Cl. ........................................ H04j 3/00

[58] Field of Search ........ 179/15 AQ, 15 AT, 15 BS

[56] References Cited

UNITED STATES PATENTS 3,678,205 7/1972 Cohen .......................... 179/15 AQ 3,735,049 5/1973 Buchner .......................... 179/15 AQ 3,736,381 5/1973 Johnson .......................... 179/15 AQ

*Primary Examiner*—Ralph D. Blakeslee

[57] ABSTRACT

A system for switching pulse code modulated, time multiplexed signals is described. In the switching system the incoming signals are converted from serial to parallel form, and signals to be sent from the switching system are converted back to serial form. An addressable storage, shared by the various transmission lines to and from the switching system, acts as a buffer for signals passing through the system. If phase differences between incoming signals should appear, which exceed the duration of a channel time, they are compensated in the common addressable storage.

5 Claims, 4 Drawing Figures

PULSE CODE MODULATION TIME DIVISION SWITCHING SYSTEM

BACKGROUND OF THE INVENTION

In conventional telecommunication switching systems, more particularly telephone switching systems, analog signals are transmitted continuously in time to physically separated transmission channels. However, the latest types of telephone switching centers do not utilize this space division principle, but they use a time division principle, according to which analog signals which are discontinuous in time, are transmitted over a channel.

Another significant development in recent years has been the design of telephone switching centers that also transmit digital signals which are discontinuous in time. In this connection, particular importance is attached to pulse code modulation (PCM), wherein at periodically consecutive points of time instantaneous amplitude values of the voice signal are represented by binary values which are then transmitted. The primary object of a PCM time division switching center, then, is to switch binary words. These words occur on the PCM receiving time division lines leading to the switching center in time channels allocated on these lines, to the individual connections. The received messages are switched to the PCM transmitting time division lines selected in accordance with the desired connection and leading away from the switching center in the time channels assigned, on these lines, to the individual connections.

In accordance with the operation on a four wire basis of the PCM time division lines leading to or from the PCM time division switching center, the switching always takes place on a four wire basis, i.e., the two directions of transmission of the switching are to be considered as separate. Generally, in PCM time division networks having a plurality of PCM time division switching centers, the latter are operated synchronously with one another, i.e., with signals transmitted with the same bit rates on different PCM time division lines. Various solutions have been proposed for the compensation of differences in bit rates, e.g., see Proceedings of IEEE, 113 (1966), 9, 1420 to 1428, 1421; Information Fernsprech-Vermittlungstechnik 5(1969) 1, 48 to 59, 51.

In the master-slave method a center clock generator determines the bit rate of the individual PCM time division switching systems of a PCM telecommunication network. In the auto-synchronous method (phase averaging method) the individual PCM time division switching centers are provided with individual clock generators which, however, are not independent of one another, but which synchronize each other.

In the asynchronous method (heterochronous method), each PCM time division switching center is provided with its own independent clock generator, with each receiving time division line opening a storage register, the storage capacity of which corresponds to the number of bits per pulse frame and in which the binary words received are retained until they fit into the pulse frame of the PCM time division switching center in question.

Finally, in the quasi-synchronous method (also called dummy bit method), the PCM time-division switching centers of a PCM telecommunication network also have their own independent clock generators, but the information bit rate, i.e., the average number of information-carrying bits per second for all PCM time-division switching centers of the entire PCM telecommunication network is made equal, since the difference between the clock frequencies of the bits of the individual PCM time division switching centers and the uniform bit rate of information is compensated by inserting bits without information known as dummy bits.

The switching connected with a PCM exchange may be effected in a manner such that the switching terminals used to connect PCM transmitting time division lines with PCM receiving time division lines are closed for the duration of an entire binary word, so that the single bits of the binary words can be transmitted consecutively. According to another kind of switching, the binary words received on the PCM transmitting time division lines are converted from serial to parallel form and thereafter switched concurrently through a number of switching terminals corresponding to the number of bits. A reconversion from the parallel form to the serial form is thereafter carried out behind the switching point. Despite the comparatively large number of switching terminals required for switching a single binary word, the total expenditure of switching terminals in such a parallel exchange is smaller than in a serial exchange, due to the possibility of their comparatively high operating speed.

A prerequisite for proper switching in a PCM time division switching center is that each of the binary words to be switched be timely available for switching. This prerequisite is not met from the start, since the individual time division transmission lines leading to a PCM time division switching center as a rule have different transmission or propogation times, and these moreover, are subject to temperature-dependent fluctuations. To produce the aforementioned prerequisites, care should, therefore, be exercised that, in addition to the above mentioned synchronization, the small phase variations ("jitters") on the transmission path be eliminated and that the mutual phase shifting of the pulse frames appearing on the individual PCM time division lines be given consideration.

The first prerequisite can be fulfilled by means of a circuit, in which the transmitted bits trigger a high-quality oscillating circuit, which determines the pulse rate of the bits thus regenerated (Proceedings of IEEE 113 (1966) 9, 1420 to 1428, 1422; Informationen Fernsprech-Vermittlungstechnik 5 (1969), 48 to 59, 51).

The second problem, namely, the taking into consideration of the phase shift of the pulse frames on the individual transmission lines of Prior PCM time division switching centers using a parallel exchange, is solved by using buffers assigned individually to the transmitting lines. These perform a transmission time compensation of up to the length of a word, and they bring about a synchronism of the pulse frames on receiving lines associated with transmitting lines through temporary storage in registers. These registers are assigned to groups of PCM receiving lines and to groups of PCM transmitting lines, in other words, and they allow a delay of up to the length of a frame. As a result of this frame synchronism, on an individual line basis, one and the same storage location may be used for the two directions of a call in a four-wire system using the addressable storage shared in such systems by several PCM time division lines at a time (e.g., see NTZ 1971 number 3, 1960 to 162, 162 right-hand column, second paragraph).

The aforementioned steps for the individual line transmission time compensation, as well as of the frame compensation, require a comparatively large expenditure for component parts. For example, the expenditure for storage in the parallel switching centers is five times as great as that of a serial switching center.

It is, therefore, an object of the invention to provide means for reducing the expenditure for delay lines and temporary storage capacity in a parallel switching center without at the same time reducing the traffic load of the system.

SUMMARY OF THE INVENTION

The aforementioned and other objects are obtained in a system for switching PCM time division signals which are serially transmitted on PCM lines and converted from serial to parallel and parallel to serial prior and subsequent to, respectively, the switching from an incoming to an outgoing PCM time division line by devices individual to the lines. The signals are buffered, as well as converted, in the course of the switching by means of an addressable storage shared by a plurality of lines. According to the invention, phase differences in the signals appearing on PCM lines to be switched, if they exceed a given time duration, are compensated through buffering in the common storage.

According to a further development of the invention, time frames are assigned in the switching center to the signals coming in from the opposite direction from the establishment of the connection and to the signals going out in said direction. These time frames are obtained by taking into consideration the total transmission time (outgoing propagation time and return time) on the segment of the multiplex lines defined by the switching center in question and a point subdividing into two segments the multiplex line going out in the direction of the establishment of connection and leading to the following switching center, or the multiplex line coming in the direction of the establishment of connection. The aforementioned subdividing points may also lie at the end of the multiplex line in question. As a result of this step, the average retention time of the common storage is reduced without requiring a propagation time compensation by means of individual delay lines.

In addition, the invention teaches how the switching system may conveniently be constructed in several stages.

In a still further development, the invention specifies the steps to be taken without elaborate circuitry to provide for an equivalent circuit to protect the equipment against a failure of the common storage or of other central parts of the switching system.

BRIEF DESCRIPTION OF THE DRAWINGS

For a detailed description of the invention in its preferred forms, reference is made to the accompanying drawings showing four figures.

DETAILED DESCRIPTION OF THE DRAWINGS

Figure 1:
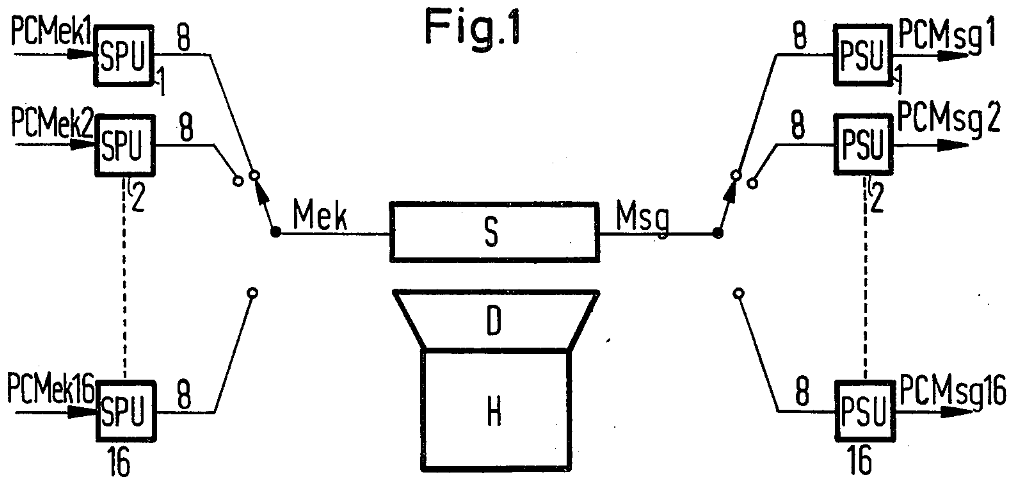
FIG. 1 is a block-schematic diagram of a single-stage embodiment of the switching system according to the invention.

FIG. 1 shows a single-stage system for switching PCM signals in accordance with the invention. The system is shown and described in detail only as necessary for understanding of the invention.

The system is used to switch 16 time division lines operated on a four-wire basis; namely, the PCM receiving time division lines PCMek1 to PCMek16 and the PCM transmitting time division lines PCMsg1 to PCMsg16 associated therewith.

The PCM receiving lines are each connected to the series input of one other of 16 serial-parallel converters SPU1 to SPU16, which are also utilized for buffering up to the duration of a time channel segment, in addition to the serial-parallel conversion, as an example, the converters comprise, if binary words of 8 bits each are transmitted, of a shift register, into which the PCM words enter in series, and an 8-stage flip-flop storage, into which the contents of the shift register are accepted, whereupon the shift register is free again for the next word.

The serial-parallel converters have, in this example, 8 parallel outputs each, which is indicated by the figure 8 on the outputs. Each of these parallel outputs is served once in the course of a scanning period. for which are used sixteen 8-wire coupling points, over which one after another a connection is established to the eight wires of a PCM multiplex receiving line Mek. The coupling point arrangement, as well as the operation thereof, is symbolized in the drawing by a rotary switch. Apparatus for scanning lines in a multiplex system is known and not described further herein.

The PCM multiplex receiving line Mek leads to the write inputs of an addressable storage S which may be a conventional core storage and which is designed to store 128 eight-bit words. The read outputs of this storage lead to the eight-wire PCM multiplex transmitting line Msg, which may be connected to the parallel inputs of 16 parallel-serial PS1 to PS16 over eight-wire coupling points in the same manner as described for the PCM multiplex receiving line. The series outputs of the parallel-serial converters are each connected with one other of the PCM transmitting lines PCMsg1 to PCMsg16.

The individual word cells of the central storage S are, as mentioned hereinabove, selectably addressed. A cyclic store H having a decoder D connected thereafter, both of known construction, serves to determine the particular word cell of the storage. It is designed to produce 16 × 32 addresses in each direction of transmission, i.e., 1024 addresses, it being assumed that the pulse frames occurring on the PCM time division lines comprise 32 time frames. The cyclic stores H1–H8 may, for example, be constructed in the same manner as the connection address memories 18 described in U.S. Pat. No. 3,678,205. The central storage S may, for example, have the same construction as the data memories 16 in the same U.S. Patent. The interaction between the storages H and the storages S in the apparatus described herein is identical to that described in U.S. Pat. No. 3,678,205, wherein time slot addresses are so written into the cyclic stores, according to the time slot allocation determined by a central control unit, and into the locations allocated individually to the 32 time slots, so that in a subsequent cyclic readout of the cyclic stores and after decoding of the addresses readout, corresponding locations of the store S or of the store S1–S8 are accessed and the addresses stored therein are readout accordingly.

In a switching process which, by way of example, is to lead to the switching of one of the PCM time division lines PCMek1 and PCMsg1 to one of the PCM time division lines PCMek16 and PCMsg16, the following operations take place: The switching center first receives, for example, via a central data channel, the request for connection expressed by a PCM transmitting terminal connected to the PCM time division line PCMek1, and this leads to the cyclic operation of the coupling point contacts connecting the parallel outputs of the serial-parallel converter SPU1 with the multiplex line MeK, e.g., during the time frame K1. Now, a free frame will be obtained for the desired connection with the PCM transmitting line PCMsg16, said time frame having the minimum possible time interval from the time frame K1. In the common storage S, a storage location is then selected, which is free between the periods K1 and K2. As such, the time channel to be seized coming in the opposite direction, i.e., the time channel utilized coming in on the PCM transmitting line PCMek16, could be fixed independently of the time channel K2.

Since, in accordance with the invention, the propogation time dependent phase shifts of the pulse frames occurring on the single PCM lines are solely compensated by individual devices on each line, up to the length of a time frame phase shifts going therebeyond would, in this case, have to be compensated by a correspondingly long buffering in the common storage S. The transmission time for communication loop which in the embodiment in question would run from a PCM transmitting terminal unit via the line PCMek1, the multiplex line Mek, the storage S, the multiplex line Msg, the PCM line PCMsg16 to the PCM receiving terminal unit connected thereat and from there in reverse direction via the lines PCMek16, Med, for the second time through the storage S, via the line Msg and via the PCM transmitting line PCMsg1 back to the PCM transmitting terminal unit connected thereat, must, together with the times of the buffering in the common storage S, always complete an integral multiple of a frame length. This insures that simultaneous sending and receiving can take place. Similar considerations also hold true, if the PCM lines do not lead directly to the terminal units, but to other switching centers. In this case, too, a phase coincidence must be assumed at some point of the PCM lines of the forward and backward direction connecting two switching centers, if the terminal units are presumed to have this phase coincidence. This means that the aforementioned transmission time conditions also occur with respect to the transmission time on the parts of the PCM time division lines which, viewed from a specific switching center, establish the connection to the preceding and subsequent centers where there is a phase coincidence.

Therefore, according to a further development of the invention, the time frame to be seized, arriving in the opposite direction, is determined as follows. With respect to the time frame K2, assigned to the connection on the PCM line which goes out in the direction of the establishment of connection, it lies farther by one time interval and is equal to the total transmission time (outgoing propogation time and return time) for the segment of the multiplex line leading to the switching center in the direction of the establishment of a connection. The aforementioned segment is defined by the switching center here considered and by a fixed point on the time division line in question. Accordingly, as between the time frame K3 thus obtained, the above mentioned transmission time, labeled d2, and having a length which is permanently incorporated into the program at the central point, as well as the time frame K2, there exists the relationship K3 = K2 + d2.

According to the invention, the time frame to be employed on the PCM transmitting line PCMsg1 is determined such that, with respect to the location of the time channel K2 assigned to the PCM time division line PCMek1, it is advanced by one time interval. This is equal to the total transmission time d1 (outgoing propogation time and return time) on the segment of the line which connects with the peceding switching center or, if the switching center involved is single-stage, with the initial PCM terminal unit. This segment is limited by the switching center considered and a point lying on the aforementioned multiplex line. The relationship between the positions of the time channels K4 and K5, as well as the transmission time d1 is thus represented by K4 = K1 − d1. After determining the time frame K4, a second storage location is selected which is free between the time frame K3 and K4.

In the course of a switching operation, data are alternately written into and read out from the common storage S, because during the time frame K1 the binary word supplied via the PCM time division line PCMek1 is retransmitted to the storage location W1. During the time frame K2 this binary word is read out from this location and retransmitted on the PCM line PCMsg16. During the time frame K3 the binary word supplied on the PCM line PCMek16 is written into the storage location W2 and read out therefrom during the time frame K4 and retransmitted via the PCM line PCMsg1.

As described hereinabove, the parallel outputs of the 16 serial-parallel converters SPU1 to SPU16, as well as the series inputs of the parallel-serial converters PSU1 to PSU16 are operated once per time frame, so that with the usual time frame length of 4 microseconds, about 244 microseconds are available for one operation. As outlined hereinabove, during this time interval, one location to be written into and one location to be read out from the common storage S are selected.

With this, an operating speed of about 8 MHz is obtained for the cyclic store that determines the addresses of the storage locations. Since this working frequency cannot be readily increased, switching centers larger than the one described hereinabove are constructed using several stages, as will be described hereinbelow.

Figure 2:
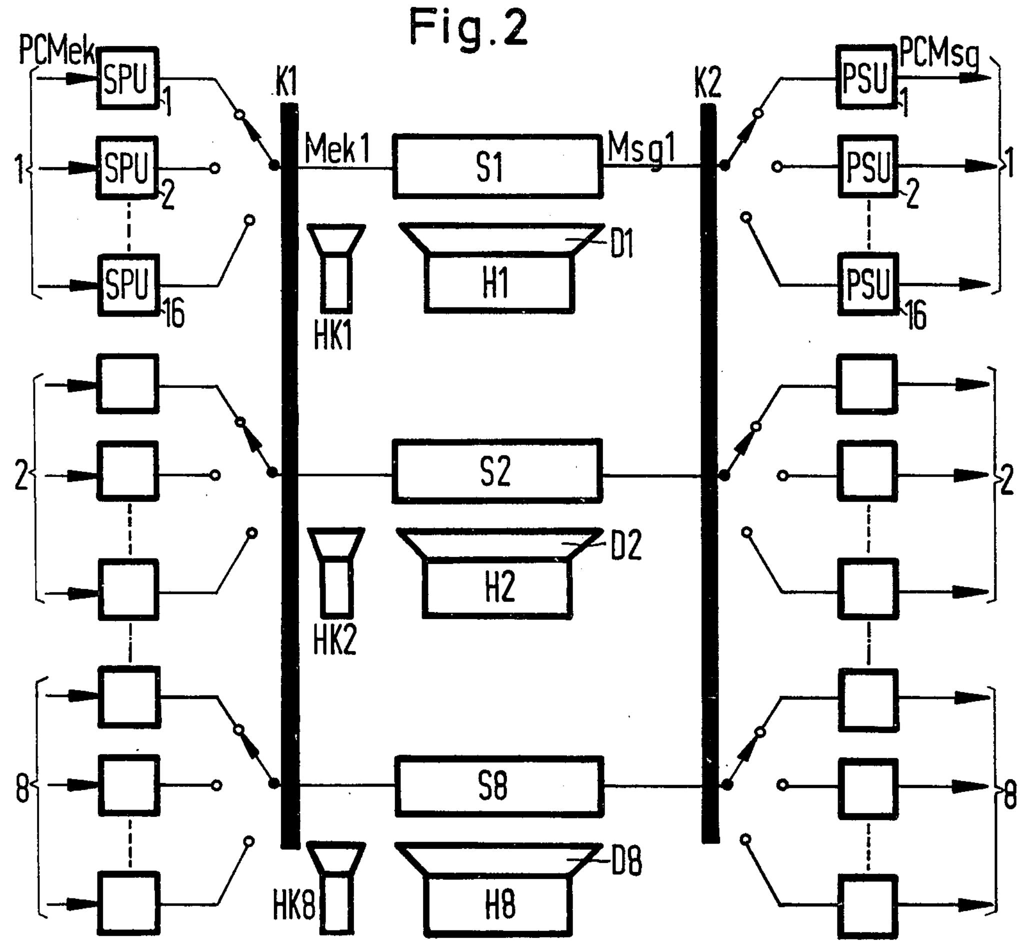
FIG. 2 is a block-schematic diagram of a multi-stage embodiment of the switching system according to the invention.

FIG. 2 illustrates diagrammatic form of an eight-stage switching center handling eight times as many PCM time division lines as the center shown in FIG. 1. Sixteen of the PCM time division lines at a time are combined into one having eight groups. Consequently, the common devices illustrated in FIG. 1; namely, the addressable storage S, as well as the cyclic store with the decoder D associated therewith, is provided 8 times.

The individual groups of PCM receiving lines and PCM transmitting lines may be assigned to each of the eight addressable storages by means of a conventional switching matrix (K1, K2) symbolized by a solid perpendicular line. Eight additional cyclic stores HK1 to HK8 which, together with a decoder connected to each of them, are each allocated to another group of coupling points so as to control the latter. These cyclic stores are constructed in the same manner as cyclic stores H1-8 described hereinabove. By this means, the individual groups of PCM lines are made accessible to all PCM multiplex lines or, as the case may be, to addressable storages.

In the course of a switching process in this type of multi-stage system, several of the addressable storages are checked during the selection of the storage locations and the selection of the first free storage is made by one of the cyclic stores KH1 to HK8. Otherwise, the same operations take place as in the single-stage switching system.

Two other modifications of the switching center in accordance with the invention will be described hereinbelow, the common system parts of which are provided in duplicate for reliability purposes.

Figure 3:
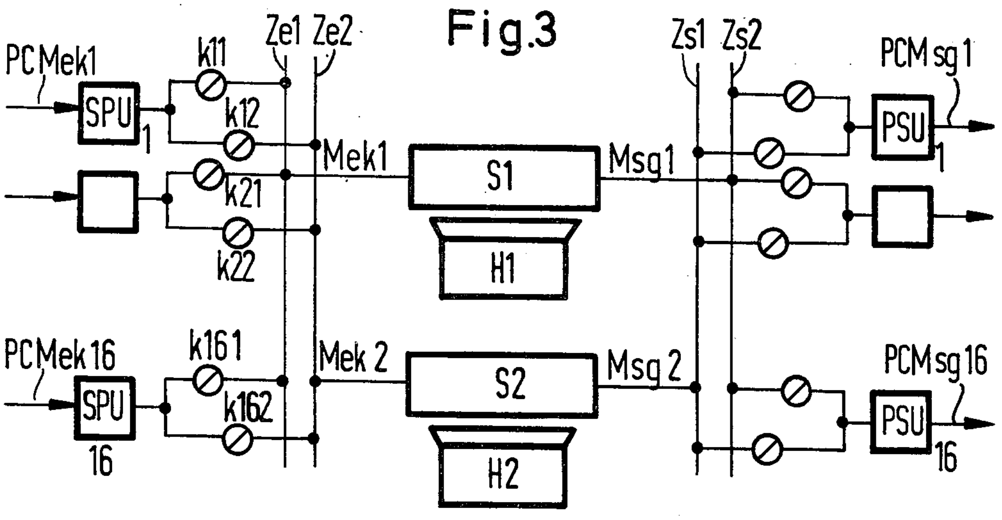
FIG. 3 shows an embodiment which is a modification of the single-stage switching system of FIG. 1.

FIG. 3 describes an equivalent circuit for a single-stage system. Contrary to the illustration in FIG. 1, two common storages S1 and S2 are provided in this case together with associated cyclic store H1 and H2 and decoders D1 and D2 with smaller storage capacities. The number of cyclically operated coupling point contacts, which in FIG. 1 are solely symbolized by the portrayal of a rotary switch, is doubled, as each of the parallel outputs of the serial-parallel converters SPU1 to SPU16 can be connected with the multiplex PCM line Mek1 leading to the storage S1 through a first coupling point contact K11 to K16 and, through a second coupling point contact k12 to k162, with the PCM multiplex line Mek2 leading to the second storage. The same holds true for the connectability of the PCM multiplex lines Msg1 to Msg2 at the transmitting end with the PCM transmitting lines.

In case of a breakdown of one of the two common devices (S1, S2; H1, H2), its function will be taken over by the other, if its loading capacity so allows. Although such failure will lead to higher losses, the device will continue to operate.

Figure 4:
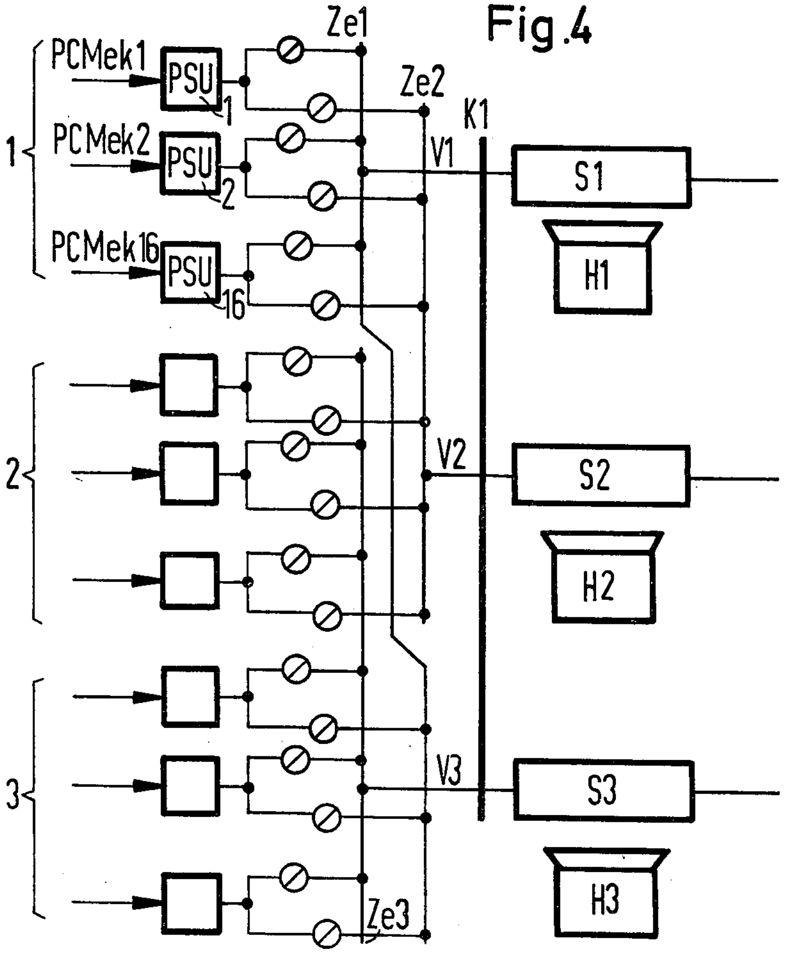
FIG. 4 shows an embodiment which is a modification of the multi-stage system in FIG. 2.

FIG. 4 further shows how the multi-stage switching center illustrated in FIG. 2 is to be constructed so as to provide redundance for the connecting circuits establishing the connection of the PCM lines with the coupling point matrices. Since in this case, from the start the storages S1 to S3 are provided several times, it is not necessary to increase their number in order to provide for a back-up circuit. Instead, each group of PCM lines, along with another group, is connected to two auxiliary lines of a number of auxiliary lines which, in conformity with the number of the groups, are provided a number of times and, together with another connecting circuit, are in communication with the coupling point matrices.

By way of example, the PCM lines of the first group, or the output lines of the parallel-serial converters PSU1 to PSU16 assigned thereto, are, together with the parallel-serial converter outputs of group 3, connected with auxiliary line Ze1, and together with the parallel-serial converter outputs of group 2, connected with auxiliary line Ze3, which combines the parallel-serial converter outputs of groups 2 and 3, is connected with connecting line V3. Thus, it is ensured that if one of the connecting lines fails, there is still access, via an auxiliary line, to another connecting line and, therewith, to coupling point matrix K1.

The embodiments of the invention described hereinabove are intended only to be exemplary of the principles of the invention. It is contemplated that changes in or modifications to the described embodiments may be made within the scope of the invention, as defined by the appended claims.

What is claimed is:

1. In a system for switching serially transmitted, time multiplexed, pulse code modulated signals having means for converting signals on incoming transmission lines from serial to parallel form to facilitate switching operations and means for converting said parallel form signals to serial form prior to transmission on outgoing transmission lines, the improvement comprising:

addressable storage means having fewer storage locations for said pulse code modulated signals than is required for words which can be transmitted during a time frame of a given channel and accessible by all of said transmission lines for providing a buffer between incoming and outgoing signals and including compensating means for compensating incoming signals when phase differences between incoming signals exceeding the duration of the time channel allocated to each connection.

2. The improved switching system defined in claim 1 wherein said compensating means comprises:

means for receiving incoming signals in the time channel assigned to the corresponding connection and for retransmitting said signals in the first available time channel location appearing thereafter, means for receiving signals in the opposite direction in a time channel location assigned to the connection in question on the transmission line concerned, said time channel location being advanced by one time interval relative to the aforementioned time channel location assigned to the outgoing transmission line, said time interval being equal to the sum of the outgoing propogation time and the return time on the segment of outgoing transmission line leading to a subsequent switching system and defined by a point subdividing said segment of line into halves, said means retransmitting said signals to the time channel location assigned to the connection on the outgoing transmission line, said time channel location being advanced by one time interval relative to the connection on said incoming transmission line, said time interval being equal to the sum of the propogation time and return time on a length of transmission line half the distance to a subsequent switching system.

3. The improved switching system defined in claim 1 having at least two common addressable storages sharing the required storage capacity for said switching system, said improved system further comprising at least a pair of auxiliary transmission lines over which each of said transmission lines can be connected to either of said addressable storages.

4. The improved switching system defined in claim 1 having a plurality of common addressable storages and wherein said incoming and outgoing transmission lines, along with associated converters, are combined into groups with each group having access to each of said addressable storages and further comprising:

switching matrix means for connecting said groups to a desired one of said common storages.

5. The improved switching system defined in claim 4 further comprising:

a plurality of auxiliary transmission lines, each of said groups being connected with two of said auxiliary lines and connecting line means connecting each of said auxiliary lines to ones of said common storages through said switching matrix means.

* * * * *